(12) United States Patent
Smeets et al.

(10) Patent No.: US 8,516,133 B2
(45) Date of Patent: Aug. 20, 2013

(54) METHOD AND SYSTEM FOR MOBILE DEVICE CREDENTIALING

(75) Inventors: Bernard Smeets, Dalby (SE); Luis Barriga, Skarpnäck (SE); Mattias Eld, Spånga (SE); Vesa Petteri Lehtovirta, Espoo (FI); Krister Sällberg, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 964 days.

(21) Appl. No.: 12/256,908

(22) Filed: Oct. 23, 2008

(65) Prior Publication Data

US 2009/0205028 A1 Aug. 13, 2009

Related U.S. Application Data

(60) Provisional application No. 61/026,768, filed on Feb. 7, 2008.

(51) Int. Cl.
*G06F 15/16* (2006.01)

(52) U.S. Cl.
USPC ........... 709/228; 709/223; 709/230; 709/238; 455/410; 455/411; 455/414.3; 455/419; 455/432.3; 455/450; 455/456.3; 455/438; 455/552.1; 726/1; 726/2; 726/3; 726/4; 726/5; 726/22; 370/352; 370/356; 370/395.54; 370/331; 370/338; 380/270

(58) Field of Classification Search
USPC .......................................................... 726/6
See application file for complete search history.

(56) References Cited

U.S. PATENT DOCUMENTS

| 6,490,445 B1 | 12/2002 | Holmes |
| 6,980,660 B1 | 12/2005 | Hind et al. |
| 7,526,642 B2 * | 4/2009 | Hurtta et al. ................. 713/155 |
| 2004/0073785 A1 | 4/2004 | Hurtta et al. |
| 2005/0015505 A1 * | 1/2005 | Kruis et al. ................. 709/229 |

(Continued)

FOREIGN PATENT DOCUMENTS

| CN | 1674497 A | 9/2005 |
| WO | 2009/092115 A2 | 7/2009 |

OTHER PUBLICATIONS

3rd Generation Partnership Project. "Changes to TR33.812, V0.1.0, General Text." S3-080010, 3GPP TSG SA WG3 Security #50, Feb. 25-29, 2008, Sanya, China.

(Continued)

*Primary Examiner* — Nathan Flynn
*Assistant Examiner* — Bryan Wright
(74) *Attorney, Agent, or Firm* — Coats & Bennett, P.L.L.C.

(57) ABSTRACT

Methods and systems taught herein allow communication device manufacturers to preconfigure communication devices to use preliminary access credentials to gain temporary network access for downloading subscription credentials, and particularly allow the network operator issuing the subscription credentials to verify that individual devices requesting credentials are trusted. In one or more embodiments, a credentialing server is owned or controlled by the network operator, and is used by the network operator to verify that subscription credentials are issued only to trusted communication devices, even though such devices may be referred to the credentialing server by an external registration server and may be provisioned by an external provisioning server. Particularly, the credentialing server interrogates requesting devices for their device certificates and submits these device certificates to an external authorization server, e.g., an independent OCSP server, for verification. A common Public Key Infrastructure (PKI) may be used for operator and device certificates.

18 Claims, 2 Drawing Sheets

(56) References Cited

U.S. PATENT DOCUMENTS

| | | |
|---|---|---|
| 2005/0079863 A1 | 4/2005 | Macaluso |
| 2005/0287990 A1* | 12/2005 | Mononen et al. ............ 455/411 |
| 2007/0099599 A1 | 5/2007 | Smith et al. |
| 2007/0121596 A1* | 5/2007 | Kurapati et al. ............ 370/356 |
| 2007/0283427 A1* | 12/2007 | Gupta et al. ...................... 726/9 |
| 2008/0076420 A1* | 3/2008 | Khetawat et al. ......... 455/435.1 |
| 2008/0108321 A1* | 5/2008 | Taaghol et al. .............. 455/410 |
| 2008/0108322 A1* | 5/2008 | Upp ............................ 455/411 |
| 2009/0191857 A1* | 7/2009 | Horn et al. .................. 455/419 |
| 2009/0239503 A1* | 9/2009 | Smeets ........................ 455/411 |
| 2009/0252309 A1* | 10/2009 | Beyer et al. ............... 379/93.02 |

OTHER PUBLICATIONS

Gehrmann, C. et al. "Method and System for Mobile Device Credentialing." Co-pending U.S. Appl. No. 11/948,352, filed Nov. 30, 2007.

3GPP, "3rd Generation Partnership Project; Technical Specification Group Services and System Aspects; Feasibility Study on Remote Management of USIM Application on M2M Equipment; (Release 8) TR 33.812 v.0.0.2 (S3-070900)," Oct. 12, 2007, pp. 1-14, Sophia-Antipolis Cedex, France.

Gallery et al., "Trusted Mobile Platforms," Foundations of Security Analysis and Design IV: Lecture Notes in Computer Science, Aug. 18, 2007, pp. 282-323, vol. 4677, Springer Berlin Heidelberg, Berlin, Germany.

* cited by examiner

METHOD AND SYSTEM FOR MOBILE DEVICE CREDENTIALING

RELATED APPLICATIONS

This application claims priority under 35 U.S.C. §119(e) from the U.S. Provisional Patent Application Ser. No. 61/026,768, which was filed on 7 Feb. 2008 and entitled "Downloadable USIM Bootstrapping."

TECHNICAL FIELD

The present invention generally relates to provisioning mobile devices, and particularly relates to facilitating over-the-air activation of mobile devices through the use of preliminary subscription identity information maintained in centralized device directories that are accessible by one or more network operators.

BACKGROUND

Efficient equipment manufacture, distribution, and activation are key enablers for effectively exploiting the range of business opportunities provided by the continuing revolution in wireless communications. The existing approaches to "provisioning" user equipment with the necessary subscription credentials represent one impediment to more efficient operations.

For example, one conventional approach relies on selling or otherwise distributing user equipment with installed Subscriber Identity Modules, SIMs. Each SIM comprises a tamper-resistant circuit module, commonly embodied in a small, card-like form factor, where the circuit module stores credential information for a specific network operator. In other words, the user equipment is tied to a particular network operator by virtue of the preprogrammed SIM, and the subscriber calls or otherwise contacts the network operator to provide billing information, etc. In response, the network operator marks that SIM as active in one or more subscriber databases, thereby making the user equipment operational.

Other approaches to automating the provisioning process, at least partially, have been proposed. Examples include U.S. Publication 2005/0079863 to Macaluso, which discloses a form of over-the-air provisioning (commonly noted as "OTA" provisioning in the relevant literature); U.S. Publication 2007/0099599 to Smith, which discusses dynamic provisioning of wireless services and initial provisioning via access to an internet database; U.S. Pat. No. 6,980,660 to Hind, which discloses methods for initializing wireless communication devices using an enterprise database; and U.S. Pat. No. 6,490,445 to Holmes, which discloses the use of temporary access information in wireless equipment, to allow a form of restricted network access for over-the-air provisioning.

As a general proposition, however, it seems that the complexity of the overall problem framework has prevented the past approaches from providing an overall system and method that simplifies manufacturing, sales, and, ultimately, registration of mobile devices with regard to secure over-the-air provisioning. Furthermore, past approaches provide either insufficient security or require one or more actors to be responsible for the operation of many of the involved steps, which requires significant levels of trust between different actors who may be in competitive relationships.

SUMMARY

Methods and systems taught herein allow communication device manufacturers to pre-configure communication devices to use preliminary access credentials to gain temporary network access for downloading subscription credentials, and particularly allow the network operator issuing the subscription credentials to verify that individual devices requesting credentials are trusted. In one or more embodiments, a credentialing server is owned or controlled by the network operator, and is used by the network operator to verify that subscription credentials are issued only to trusted communication devices, even though such devices may be referred to the credentialing server by an external registration server and may be provisioned by an external provisioning server. Particularly, the credentialing server interrogates requesting devices for their device certificates and submits these device certificates to an external authorization server, e.g., an independent OCSP server, for verification. A common Public Key Infrastructure (PKI) may be used for operator and device certificates.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
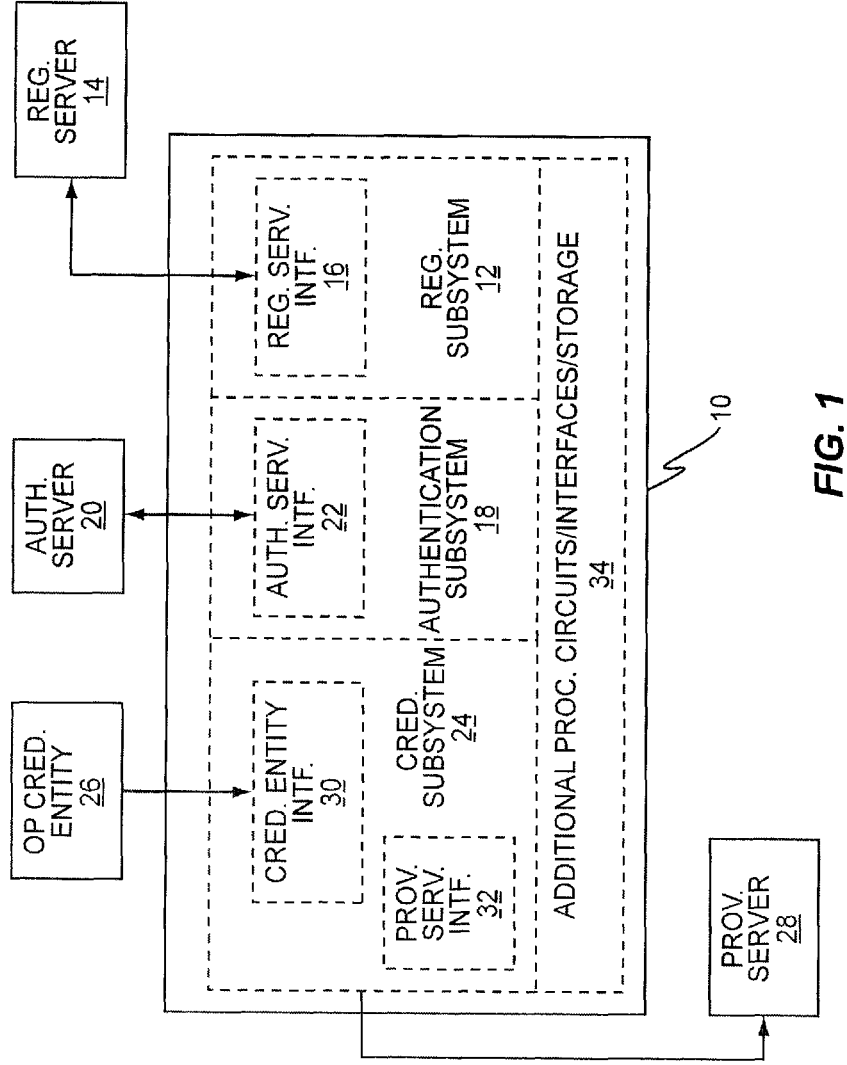
FIG. 1 is a block diagram illustrating one embodiment of a credentialing server, shown in context with various other servers.

FIG. 1 illustrates one embodiment of a credentialing server 10. As contemplated herein, the credentialing server 10 and its associated method of operation "bootstrap" the credentialing process, wherein downloadable subscription credentials are securely and reliably downloaded to trusted communication devices that have gained temporary network access. The subscription credentials are, for example, software-based downloadable universal subscriber identity modules (DLUSIMs) that are downloaded into trusted computing systems within the communication devices. The credentialing server 10 therefore may be referred to as a DLUSIM server.

Acting as a DLUSIM server, the credentialing server 10 in one or more embodiments is configured to support downloading of subscription credentials to un-credentialed communication devices. Supporting this functionality, the illustrated credentialing server 10 comprises a registration subsystem 12 configured to register communication devices (not shown) to be credentialed with an external registration server 14, by providing registration information for the communication devices to the registration server 14. The registration subsystem 12 includes a registration server interface 16, such as a wired or wireless connection and supporting processing circuitry implementing one or more communication protocols for communicating with the registration server 14. In at least one embodiment, the registration server interface 16 comprises an Internet Protocol (IP) interface, for IP-based communications with the registration server 14.

The credentialing system 10 further includes an authentication subsystem 18 to interrogate registered communication devices for their device certificates and to submit the device certificates to an external authentication server 20 for verification. Here, a "registered" communication device is one that has been (initially) registered with the registration server 14 by the credentialing system 10, and subsequently referred to the credentialing system 10 by the registration server 14, for actual subscription credentialing. Of course, the credentialing system 10 may interface with more than one external registration server, and thus may initially register communication devices with any number of registration servers 14. Indeed, it is a point of flexibility and security that the credentialing server 10 can be owned or otherwise controlled by a specific network operator, while the registration server 14 (or other registration servers) may be owned or otherwise controlled by the same network operator, another network operator, a device manufacturer, or some other third party.

The advantages of third-party ownership also may be applied to the authentication server 20, which may be an independent certification authority that provides trusted certificate verification services to the credentialing server 10. This arrangement advantageously allows a given network operator to own or otherwise control the credentialing server 10, while taking advantage of established Public Key Infrastructure (PKI) systems for verification that a given communication device seeking subscription credentials is trusted. For example, in one or more embodiments, the authentication subsystem 18 includes an authentication server interface 22 that implements online certificate status protocol (OCSP), and the authentication server 20 correspondingly is a third-party, independent OCSP server. From a trust level, it is advantageous that the actor that verifies the trust of devices to be credentialed is not the (credentialing) network operator or the device manufacturer, but instead is an independent actor whose business is to verify devices.

As those skilled in the art will appreciate, OCSP is an Internet protocol used for obtaining the revocation status of X.509 digital certificates. (RFC 2560 describes OCSP.) In turn, X.509 is an ITU-T cryptographic standard for a PKI, for sign-on and privilege management. The X.509 standard provides for standard formats for public key certificates, etc., and it is one approach contemplated herein for using an overall PKI to establish and verify trust between operator equipment, e.g., the credentialing server 10, and communication devices to be credentialed. Broadly, in one or more embodiments, the credentialing server 10 is configured to store or otherwise maintain authentication certificates that are part of a public key infrastructure (PKI) also encompassing the operator credentialing entity 26, and the communication devices to be credentialed.

For such credentialing, the credentialing server 10 includes a credentialing subsystem 24. The credentialing subsystem 24 is configured to request subscription credentials from an operator credentialing entity 26 for verified communication devices, refer the verified communication devices to an external provisioning server 28 for subscription credentials provisioning, and transfer the subscription credentials to the provisioning server 28 for subscription credentials provisioning of the verified communication devices. Supporting these operations, the credentialing subsystem 24 includes a credentialing entity interface 30, which provides a secure or otherwise protected communication link in one or more embodiments. In one embodiment, the credentialing entity interface 30 supports a private, possibly localized, communication link to a home subscriber server (HSS) that generates or otherwise has access to new subscription credentials for credentialing registered, verified communication devices with long-term network subscription credentials.

Rather than performing the actual subscription credentials provisioning, the credentialing server 10 obtains subscription credentials for registered and verified communication devices, and transfers them to the provisioning server 28. To this end, the credentialing subsystem 24 further includes a provisioning server interface 32, which may be configured to implement whatever protocols are used by the provisioning server 28. Advantageously, this arrangement relieves the credentialing server 10 from having to know the implementation details—e.g., the software versions and configurations—of the communication devices being credentialed. To this end, the provisioning server 28 may be a standardized provisioning system, such as an Open Mobile Alliance (OMA) device management (DM) server. It also should be noted that the provisioning server 28 may or may not be owned or controlled by the network operator, and that the credentialing server 10 may interface to more than one provisioning server.

Of further note, those skilled in the art will appreciate that the credentialing server 10 generally supports other functions and communications, such as maintenance, monitoring, configuration, and provisioning activities, and generally has additional processing, interface, and storage elements 34. For example, a subscription contract processing system of the network operator that owns or controls the credentialing server 10 may be co-located with or integrated into the credentialing server 10. Such a system provides front-end processing, allowing operators to set up communication devices for initial registration responsive to requests from device owners. Initial contract processing may be based on, for example, on a web server and supporting database, wherein device owners enter subscription choices, payment information, device information, etc. In another embodiment, the operator's subscription contract processing system is implemented separately from the credentialing server 10, and the additional processing/interface circuits 34 of the credentialing server 10 include an interface for communicating with a subscription contract processing system.

In at least one embodiment, the credentialing server 10 is a computer system having appropriate communication interfaces as described above. In such embodiments, execution of stored computer program instructions by one or more microprocessors or other digital processing elements implements the subscription credentialing server operations taught herein. These computer program instructions are stored in a computer readable medium, such as in non-volatile memory or on hard disc within the credentialing server 10.

Figure 2:
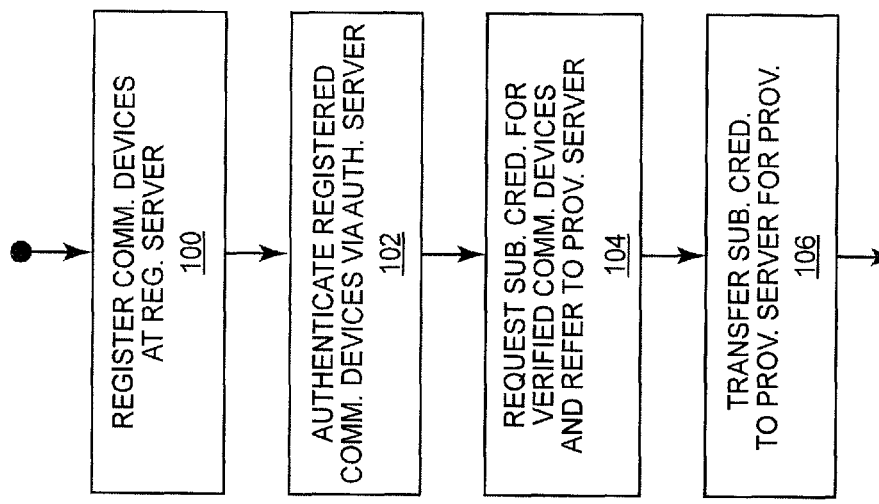
FIG. 2 is a logic flow diagram illustrating one embodiment of processing logic supporting a method of subscription credentialing as may be implemented by the credentialing server of FIG. 1.

According to such processing, the credentialing server 10 implements a subscription credentialing method, an example of which is given in FIG. 2. The illustrated processing "begins" with the credentialing server 10 registering communication devices at one or more registration servers (Block 100), e.g., at the registration server 14. While this process may be done for batches of communication devices, it also may be done as needed for individual communication devices.

For example, the purchaser of a given communication device contacts the network operator associated with the credentialing server 10 and negotiates a given service contract. Device information, e.g., a device identifier, is provided as part of this transaction, allowing the device to be later identified when it is turned on for activation on the operator's network. The operator's subscription contract processing system electronically contacts the credentialing server 10 (if implemented separately) and provides it with all or a relevant part of the device information. In response to receiving this information, the registration subsystem 12 of the credentialing server 10 registers the communication device with the registration server 14. In one embodiment, the registration subsystem 12 is configured to register a given communication device by generating a registration nonce that is unique for the given communication device, and sending the registration nonce to the registration server 14 as part of the registration information. In this or other embodiments, the registration subsystem 12 is further configured to include credentialing server routing information as part of the registration information, for use by the registration server 14 in referring registered communication devices to the credentialing server 10.

The communication devices are in general configured to gain temporary network access upon being turned on for activation with a selected network operator. Thus, a given communication device is associated with the operator that owns the credentialing server 10, the credentialing server 10 registers that given communication device (which may be thought of as "pre-registration" or "initial registration") and provides corresponding registration information to the registration server 14. The given communication device is turned on at some later time, and uses preliminary access credentials to gain temporary network connectivity, and it uses that connectivity to access the registration server 14, which refers it to the credentialing server 10, based on the registration information stored at the registration server 14 for that given communication device.

Thus, the processing method of FIG. 2 further includes authenticating registered communication devices via one or more external authentication servers (Block 102), e.g., via the authentication server 20, which may be an OCSP server. Again, while such authentication processing can be done in batches, at least one embodiment of the credentialing server 10 performs authentication processing for individual communication devices, responsive to receiving individual subscription credential requests from those devices, as they are referred to the credentialing server 10 by the registration server 14. The authentication subsystem 18 is configured to interrogate registered communication devices for their device certificates and to submit the device certificates to an external authentication server for verification, said registered communication devices being referred to the credentialing server by the registration server.

As part of such processing, for a given communication device, the authentication subsystem 18 is configured to verify that the communication device (requesting credentials) is a registered communication device by verifying that a registration session nonce provided by the communication device is derived from the registration nonce uniquely generated by the registration subsystem 12 for the communication device. In this regard, the registration server 14 is contacted by a given communication device, determines that device's identity, and provides that device with the registration nonce it received from the credentialing system 10 for that device. In turn, the communication device uses that registration nonce to generate a registration session nonce that is provided to the credentialing server 10 for verification.

Thus, in one or more embodiments, as part of interrogating a given communication device, the authentication subsystem 18 verifies that the given communication device is a "registered" communication device based on verifying that a registration session nonce provided by the given communication device correctly derives from the corresponding registration nonce previously generated for that device as part of registering it with the registration server 14. Registration information for a given communication device, including the registration nonce, can be marked as used (or can be deleted), after providing subscription credentials for the given device, to prevent replay attacks. Registration information also can be configured to expire after a certain period of time.

Assuming that a given communication device was properly registered and assuming that the authentication server 20 provides independent authentication of the device certificate obtained from the given communication device, the credentialing system 10 requests subscription credentials for the given communication device. In one or more embodiments, the credentialing subsystem 24 requests subscription credentials from the operator credentialing entity 26 for verified communication devices (i.e., registered devices with valid certificates), refers the verified communication devices to the external provisioning server 28 for subscription credentials provisioning (Block 104), and transfers the subscription credentials to the provisioning server 28 for subscription credentials provisioning of the verified communication devices (Block 106).

Figure 3:
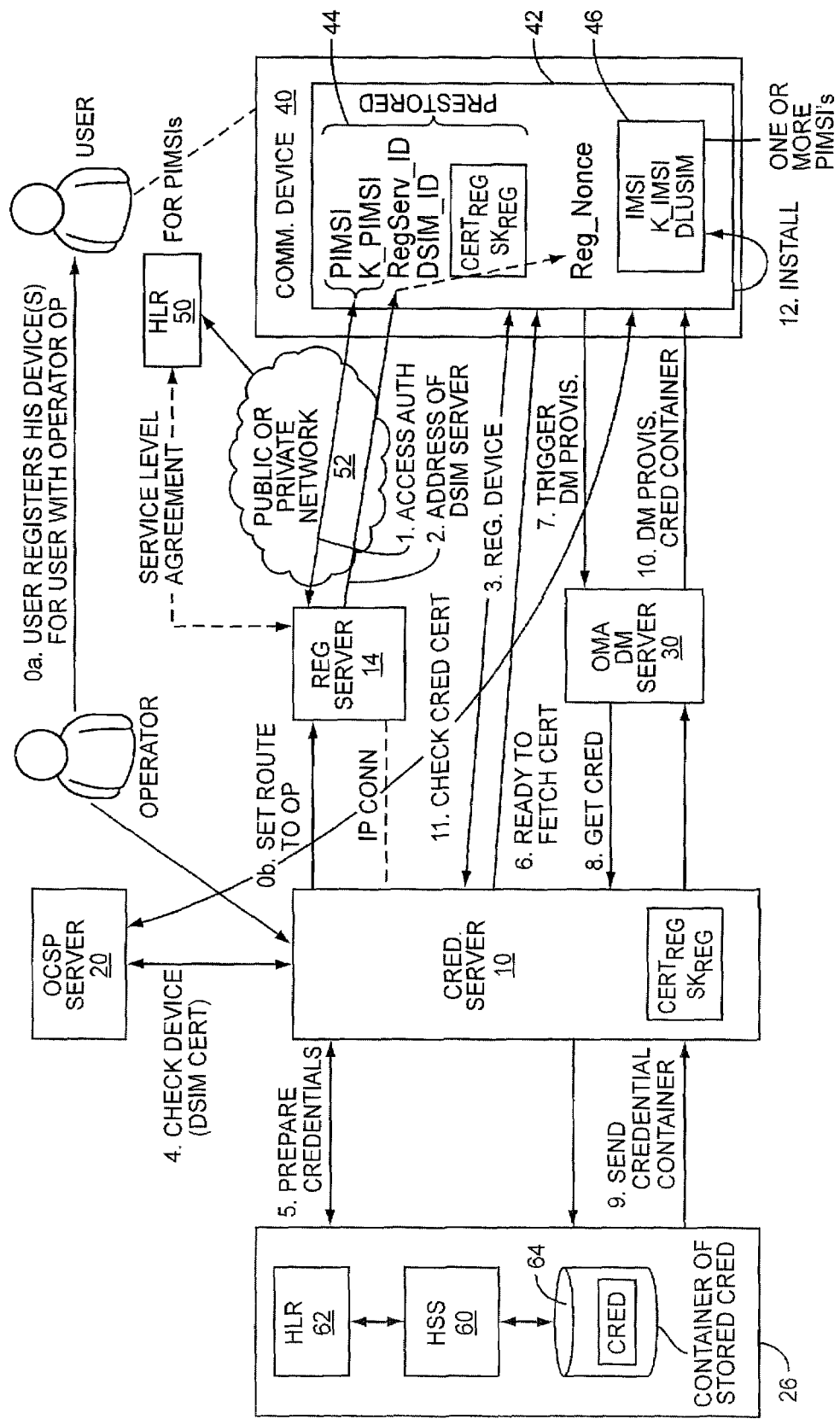
FIG. 3 is an overall system diagram, illustrating one embodiment of subscription credentialing for a given communication device, as supported by a credentialing server as taught herein.

Often, the operator credentialing entity 26 is an HSS that includes or is associated with a secure system for generating or otherwise issuing long-term subscription credentials. HSS entities therefore typically are closely controlled by network operators and it is advantageous that the credentialing server 10 also can be owned or otherwise controlled by a given network operator, without compromising the ability to use external resources for giving network access (e.g., roaming access) to communication devices seeking subscription credentials, and for authenticating and provisioning such devices. FIG. 3 presents a more detailed "system" diagram as a basis for discussing these and other non-limiting aspects of the credentialing server 10.

In understanding the process flow captured in the information/communication connections depicted in FIG. 3, it will be helpful to note that the example communication device 40 is configured with certain pre-stored data 44, such as a preliminary IMSI (PIMSI) and a corresponding PIMSI cryptographic key, K_PIMSI. The device 40 also may hold a registration server identifier (RegServ_ID), a downloadable SIM ID, DSIM_ID, a DSIM certificate, $CERT_{DSIM}$, and a secret key for the $CERT_{DSIM}$, $SK_{DSIM}$. Such information can be loaded into the device 40 before it is released or otherwise sold to a user, and some or all of this stored information can be held in a secure processing module 42 of the device 40. For example, the secure processing module 42 may be a trusted module having software and physical protections against tampering. As non-limiting examples, the secure processing module 42 can be configured according to ARM® TrustZone®, Mobile Trusted Module (MTM), Trusted Platform Module (TPM) implementations, or inside a UICC (universal integrated circuit card).

In one or more embodiments, the secure processing module 42 includes, for example, a secure processor, secure memory, and a cryptographic engine. Other secure processing environments can be used, and the secure architecture details that are illustrated should not be construed as limiting the teachings presented herein. It also should be understood that the secure processing module 42 is used to securely store long-term subscription credentials 46 that are of interest herein.

With that understanding, the user (e.g., owner) of the device 40 contacts a network operator with whom the user wishes to enter into a service agreement (Step 0a). This initial user-to-operator contact initiates device registration because, in response to the user contact, an operator computer system, e.g., a new subscriber processing system, electronically contacts the credentialing server 10. In response to this contact, the credentialing server 10 delivers registration information for the device 40 to the registration server (Step 0b). As noted, the registration information may comprise a registration nonce or other identifier generated for the device 40, along with routing information to be used by the device 40 in contacting the credentialing server 10.

At some later time, the user switches on the device 40 and it authenticates itself to a preliminary Home Location Register (PHLR) 50 using the PIMSI and K_PIMSI pre-stored in the device 40 (Step 1). The PHLR may belong to a different network operator, and may be configured to provide at least temporary network communication access to any device that presents valid preliminary access credentials. In any case, assuming the existence of a service level agreement between the owner/operator of the PHLR 50 and the registration server 14, a communication link is setup between the device 40 and the registration server 14. For example, an IP-based link may be established via one or more mobile or public or private IP networks 52.

The registration server 14 uses the established communication link to deliver routing information and the registration nonce to the device 40 (Step 2). Note that the registration information preferably is transferred to the secure processing module 42. In turn, the device 40 uses the routing information to contact the credentialing server 10 and provide identifying information (Step 3). The credentialing server 10 responds to this subscription credentials request by checking whether the secure processing module 42 of the device 40 holds a valid device certificate. For example, the credentialing server 10 checks if the secure processing module 42 is approved (Step 4). Such processing may be carried out using OCSP and PKI, and preferably is supported by the authentication server 20 acting as an independent certifying authority.

Assuming that the device 42 is verified, the credentialing server instructs the operator credentialing entity 26 to prepare subscription credentials for the device 42 (Step 5). Here, the operator credentialing entity 26 comprises an HSS 60, that includes or is associated with an HLR 62, and a (secure) credentials repository 64, which stores or otherwise generates long-term subscription credentials for individual communication devices. In at least one embodiment, the credentialing subsystem 24 of the credentialing server 10 instructs the HSS 60 to prepare a binding of subscription credentials to the secure processing module 42 of the device 40. (The secure processing module 42 provides a secure processing environment and, where the device 42 is a mobile device, e.g., a cellular telephone or other mobile terminal or station, the secure processing module 42 may be referred to as a DLUSIM Mobile Environment or DLUSIME.)

In one example of such processing, the credentialing subsystem 24 sends a message to the HSS 60 via a secure communication link established through the credentialing entity interface 30, requesting that the HSS 60 bind an IMSI and IMSI key pair, denoted as {IMSI, K}, to the DLUSIME of the device 40. In particular, the HSS 60 may cryptographically "wrap" the credentials and sign the wrapped credentials with a key associated with the network operator that owns or controls the HSS 60 and the credentialing server 10. In one particular embodiment, the credentials are XML encrypted with the public key of the trusted computing module 42 in the communication device 40, and XML signed with the operator's secret key.

Of course, other encryption/signing arrangements are contemplated and, in any case, it should be understood that the HSS 60 advantageously can provide the subscription credentials intended for the device 40 to the credentialing server 10 in encrypted form, which reduces processing requirements and security risks at the credentialing server 10 and at the provisioning server 30. The credentialing server 10 sends a message to the device 40 that its credentials are ready (Step 6), and, preferably, that messaging includes nonce information that the device 40 checks against the nonce information it first received from the registration server 14 or from the credentialing server 10 as part of verification processing at the outset of subscription credentialing. Such nonce information guards against replay attacks, and prevents issuance of additional subscription credentials.

As part of or in addition to such messaging, the credentialing subsystem 24 refers the device 40 to the provisioning server 30, e.g., it provides routing information to the device 40 that identifies or otherwise directs the device 40 to the provisioning server 30. As noted, the provisioning server 30 is, in a non-limiting but advantageous example, an OMA device management server that is configured to provide a range of provisioning services for devices of the same type as the device 40 (and, possibly, for many types of devices and/or many different device software versions).

It is advantageous in this regard that the subscription credentials are, in one or more embodiments, transferred from the credentialing server 10 to the provisioning server 30 in encrypted form, meaning that the provisioning server 30 need not implement security or restriction protocols beyond those which it normally implements for managing a range of device provisioning operations. Of course, the further advantage is that by deferring the actual transfer of the subscription credentials to the provisioning server 30, which by definition already knows how to conduct provisioning transactions with the device 40, detailed provisioning protocols need not be implemented in the credentialing server 10.

Subsequent to the credentialing server 10 referring the device 40 to the provisioning server 30, the device 40 triggers the provisioning server 30 to provide the subscription credentials to it (Step 7). In response, the provisioning server 30 sets up a provisioning session with the device 40 and sends a message to the credentialing server, requesting the (encrypted) subscription credentials for the device 40 (Step 8). The credentialing server 10 transfers the encrypted subscription credentials to the provisioning server 30 in response to the request (Step 9), which then provides the encrypted subscription credentials to device 40, for decryption and verification by the trusted computing module 42 of the device 40 (Step 10). For example, the trusted computing module 42 verifies the credential signature information and the included nonce information. The trusted computing module 42 further checks the operator's certificate (using the OCSP and PKI services of the OSCP server 20 (Step 11). Assuming that all verifications are successful, the trusted computing module 42 decrypts the encrypted credentials {IMSI, K}, and stores them within its secure processing environment (Step 12).

The above processing and variations of it provide for an efficient and streamlined method of "bootstrapping" subscription credentialing for communication devices. Such efficiencies are advantageous with respect to retail distribution of consumer devices, e.g., phones, pagers, PDAs, etc., as well as in machine-to-machine (M2M) applications. With M2M, the communication devices may be cellular modem modules, configured for embedded system use, e.g., vending machines, electric meters, various monitoring stations, etc. Such devices may be purchased by a user in bulk, and individually installed at later times, at potentially many different locations.

Advantageously, the M2M device purchaser enters into a service agreement with a given network operator, and the above described registration and credentialing processing can be carried out for any number of M2M devices. One may assume that a standard PKI, using X.509 certificates for example, is used and that a corresponding Certificate Authority (CA) certificate is known to all parties that need to perform certificate verification of certificates belonging to the PKI. Further, one may assume that the revocation of certificates is performed through the OSCP server 20 (more than one OSCP server could be involved).

A manufacturer of approved M2M devices gets a device certificate within the common PKI, and stores that certificate, its corresponding secret key, and the CA's root certificate in the trusted computing module 42 of each M2M device. The M2M device manufacturer also stores preliminary credentials (temporary access credentials) in each M2M device, e.g., the PIMSI and the corresponding AKA key, K_PIMSI, discussed earlier. These preliminary credentials belong to the chosen operator, and it is assumed that that operator provides access to the registration server 14, such as by maintaining PHLRs 50 (from FIG. 3) to support temporary network access for preliminarily credentialed devices and/or by maintaining roaming agreements with one or more operators providing such PHLRs. The M2M devices can be preconfigured with the network addresses of one or more registration servers 14.

In view of the above framework, a user enters into a service agreement with an operator, and the operator initiates an electronic transaction with its credentialing server 10 for the user's one or more communication devices. The credentialing server 10 connects to the registration server 14 and instructs it to route the bootstrap contact for these one or more communication devices to the credentialing server 10. A given device is switched on, gains temporary communication network access, contacts a registration server, and is referred to a given credentialing server. The credentialing server uses an independent CA to verify the device's certificate, i.e., to determine whether the device can be trusted by the operator.

If verified, the credentialing server requests subscription credentials for the device, and refers the device to a provisioning server, e.g., a standard OMA device management server. The device contacts that provisioning server, which in turn contacts the credentialing server. The credentialing server in turn transfers the device's subscription credentials to the provisioning server for actual provisioning to the device. (The provisioning server also may provision other data items to the device.) Notably, the transferred subscription credentials preferably are in encrypted form, as received over a secure link from the operator's HSS or other credentialing entity, and are transferred to the provisioning server in encrypted form. Doing so allows use of a standard provisioning server, and simplifies security concerns.

Thus, the teachings herein provide for a system and method for facilitating communication device provisioning, using over-the-air (OTA) and/or IP-based connections, wherein a credentialing server that preferably is under the control of a given operator is used to verify that a device requesting subscription credentials is trusted, while still allowing the use of any number of registration servers and provisioning servers, which may or may not be owned or controlled by the network operator. Use of the credentialing server as an intermediary between an operator's HSS, which is a highly sensitive entity, and various registration, provisioning, authentication servers, allows for these various servers to be used, without exposing the core aspects of credentials generation and trusted device verification to entities that may be shared with other operators or third parties, or that are otherwise outside the operator's direct control.

However, it should be understood that the foregoing description and the accompanying drawings represent non-limiting examples of the methods, systems, and individual apparatuses taught herein. As such, the present invention is not limited by the foregoing description and accompanying drawings. Instead, the present invention is limited only by the following claims and their legal equivalents.

What is claimed is:

1. A credentialing server configured to support downloading of subscription credentials to un-credentialed communication devices, said credentialing server comprising:
a registration subsystem configured to register un-credentialed communication devices with an external registration server by providing registration information for the communication devices to the registration server;
an authentication subsystem to interrogate registered communication devices for their device certificates and to submit the device certificates to an external authentication server for verification, said registered communication devices being referred to the credentialing server by the registration server; and
a credentialing subsystem to request subscription credentials from an operator credentialing entity for verified communication devices, refer the verified communication devices to an external provisioning server for subscription credentials provisioning, and transfer the subscription credentials to the provisioning server for subscription credentials provisioning of the verified communication devices.

2. The credentialing server of claim 1, wherein the registration subsystem includes an Internet Protocol, IP, based registration server interface to communicatively couple the credentialing server to the registration server.

3. The credentialing server of claim 1, wherein the authentication subsystem includes an online certificate status protocol, OCSP, based authentication server interface to communicatively couple the credentialing server to the authentication server.

4. The credentialing server of claim 1, wherein the credentialing subsystem includes a secure network interface to communicatively couple the credentialing server to a home subscriber server, HSS, serving as the operator credentialing entity.

5. The credentialing server of claim 1, wherein the registration subsystem is configured to register a given communication device by generating a registration nonce that is unique for the given communication device, and sending the registration nonce to the registration server as part of the registration information.

6. The credentialing server of claim 5, wherein the registration subsystem is further configured to include credentialing server routing information as part of the registration information, for use by the registration server in referring registered communication devices to the credentialing server.

7. The credentialing server of claim 5, wherein, for a given communication device, the authentication subsystem is configured to verify that the communication device is a registered communication device by verifying that a registration session nonce provided by the communication device is derived from the registration nonce uniquely generated by the registration subsystem for the communication device.

8. The credentialing server of claim 1, wherein, for each given un-credentialed communication device, the registration subsystem generates a unique registration nonce as part of the registration information sent to the registration server for registering that given communication device, and wherein, as part of interrogating a given communication device, the authentication subsystem verifies that a registration session nonce provided by the given communication device correctly derives from a corresponding registration nonce.

9. The credentialing server of claim 1, wherein the credentialing server is configured to store or otherwise maintain authentication certificates that are part of a public key infrastructure (PKI) also encompassing the operator credentialing entity and the un-credentialed communication devices.

10. The credentialing server of claim 1, wherein the operator credentialing entity is a home subscriber server, HSS, and wherein the credentialing subsystem includes a communication link with the HSS, and is configured to receive encrypted subscription credentials from the HSS, for transfer in encrypted form to the provisioning server.

11. A method of providing for subscription credentials downloading to communication devices comprising:
- registering un-credentialed communication devices at a registration server by providing registration information for the communication devices to the registration server;
- receiving credentials requests from registered communication devices referred by the registration server and, in response, interrogating the registered communication devices for their device certificates;
- submitting the device certificates to an external authentication authority for verification, wherein registered communication devices having verified device certificates are deemed to be verified communication devices;
- requesting subscription credentials from an operator credentialing entity for verified communication devices and correspondingly referring verified devices to an external provisioning server for subscription credentials provisioning; and
- subsequently transferring subscription credentials received from the operator credentialing entity for the verified devices to the external provisioning server.

12. The method of claim 11, wherein providing registration information for the communication devices to the registration server comprises communicating the registration information to the registration server via Internet Protocol, IP, communications.

13. The method of claim 11, wherein submitting the device certificates to an external authentication authority for verification comprises submitting device certificates to an online certification status protocol server.

14. The method of claim 11, wherein registering un-credentialed communication devices at a registration server by providing registration information for the communication devices to the registration server comprises, for a given un-credentialed communication device, generating a registration nonce that is unique for the given communication device, and sending the registration nonce to the registration server as part of the registration information sent for that given communication device.

15. The method of claim 14, wherein registering un-credentialed communication devices at a registration server by providing registration information for the communication devices to the registration server comprises, for the given communication device, sending credentialing server routing information as part of the registration information, for use by the registration server in referring the given communication device to the credentialing server.

16. The method of claim 14, further comprising, for a given communication device requesting credentials, verifying that the requesting communication device is a registered communication device by verifying that a registration session nonce provided by the requesting communication device is derived from the registration nonce uniquely generated by the registration subsystem for the requesting communication device.

17. The method of claim 11, further comprising, for each given un-credentialed communication device, generating a unique registration nonce as part of the registration information sent to the registration server for registering that given communication device, and, as part of interrogating a given communication device, verifying that a registration session nonce provided by the given communication device correctly derives from a corresponding registration nonce.

18. The method of claim 11, further comprising receiving subscription credentials from the operating credentialing entity as encrypted subscription credentials, and wherein subsequently transferring the subscription credentials to the external provisioning server comprises transferring the subscription credentials in encrypted form.

* * * * *